(12) United States Patent  
Hee

(10) Patent No.: US 6,454,434 B1
(45) Date of Patent: Sep. 24, 2002

(54) FLASHLIGHT UNIT WITH EXTERNALLY SUPPORTED BATTERY

(76) Inventor: Robert K Hee, 1510 16th Ave., Honolulu, HI (US) 96816

( * ) Notice: Subject to any disclaimer, the term of this patent is extended or adjusted under 35 U.S.C. 154(b) by 0 days.

(21) Appl. No.: 09/697,833

(22) Filed: Oct. 27, 2000

(51) Int. Cl.⁷ .................................................. F21L 4/04
(52) U.S. Cl. ...................................... 362/194; 362/183
(58) Field of Search .............................. 362/109, 119, 362/157, 183, 184, 190, 191, 194, 195, 204, 205, 208, 222, 249, 364, 368

(56) References Cited

U.S. PATENT DOCUMENTS

| 3,283,137 | A | * | 11/1966 | Hoesl ........................... 362/194 |
| 3,523,290 | A | * | 8/1970 | Elledge, Jr. ................. 340/331 |
| 4,325,107 | A | | 4/1982 | MacLeod |
| 4,395,696 | A | | 7/1983 | Menard |
| 4,903,178 | A | * | 2/1990 | Englot et al. ................ 362/183 |
| 5,055,986 | A | | 10/1991 | Johnson |
| 5,103,383 | A | * | 4/1992 | Mayhew ...................... 362/186 |
| 5,321,349 | A | | 6/1994 | Chang |
| 5,786,106 | A | | 7/1998 | Armani |
| 6,042,235 | A | | 4/2000 | Hee |

* cited by examiner

Primary Examiner—Sandra O'Shea
Assistant Examiner—Ismael Negron
(74) Attorney, Agent, or Firm—Michael I Kroll

(57) ABSTRACT

A flashlight assembly unit for connecting a flashlight to an external power supply such as a rechargeable cellular telephone battery. The power supply unit includes a housing and a pair of terminals positioned on the housing, the pair of terminals including a positive terminal and a negative terminal. A first flashlight is positioned within the housing and connected to the pair of terminals. A clamp releasably secures the external power supply to the housing such that a positive and negative terminals contact both a positive and negative terminal on the external power supply, respectively.

9 Claims, 11 Drawing Sheets

FLASHLIGHT UNIT WITH EXTERNALLY SUPPORTED BATTERY

BACKGROUND OF THE INVENTION

1. Field of the Invention

The present invention relates generally to rechargeable battery systems and, more specifically it relates to a DC power supply unit including pivotably adjustable external positive and negative contacts for establishing a connection with terminals of an external battery and providing power from the external battery to a flashlight, the battery being releasably secured to the DC power supply unit by a clamping mechanism.

2. Description of the Prior Art

Numerous types of rechargeable battery systems have been provided in the prior art. For example, U.S. Pat. Nos. 4,658,107; 4,395,696, 5,055,986; 5,321,349; 6,045,235 all are illustrative of such prior art. While these units may be suitable for the particular purpose to which they address, they would not be as suitable for the purposes of the present invention as heretofore described.

U.S. Pat. No. 4,325,107
Inventor: Richard H. Macleod
Issued: Apr. 13, 1982

An improved rechargeable flashlight having a casing of dielectric material including adapter means for recharging the batteries from a power source such as a battery in a vehicle, said adapter means including a phono plug terminal mating with a phono jack in the casing wall and a terminal plug for insertion into a cigarette lighter receptacle on a vehicle's dashboard, terminal plug having a current limiting resistor in the charging circuit to provide a safe charging voltage and current to the rechargeable batteries in the flashlight and preferably an LED (light emitting diode) is in the charging circuit to indicate charging current is being received from the charging source and accepted by the flashlight batteries. Further included is an integral crossmember within the flashlight casing serving as a fixed partition between the in the flashlight casing and the flashlight bulb thereby isolating the bulb against shock impact from battery movement, an on-off switch mechanism comprising an internal bus bar which is movable fore and aft in the flashlight casing and has at one end an electrical connection to the photo plug socket in the flashlight casing and at its other end a continuous electrical contact with a metal sleeve attached to the interior wall of the casing and a flexible spare bulb holder insertable in the flashlight's rear end cap. This invention to improvement in rechargeable flashlights.

U.S. Pat. No. 4,395,696
Inventor: Roger O. Menard
Issued: Jul. 6, 1983

A portable, lightweight and inexpensive emergency power pack to be hooked up to the lighting system of a vehicle trailer, such as a semi-trailer, camper, mobile home or the like, for the purpose of flashing all or some trailer lights on and off while the trailer is unhitched on the side of a road so as to warn passing motorists of its presence. The device includes a battery, an on-off switch, a flasher and an illuminating light. The case for supporting the battery and other components is made of a unitary, molded plastic piece, and includes a cylindrical housing on one side thereof that contains an adapter plug for connecting to a mating plug in the vehicle trailer. Auxiliary warning lights may also be strung from a special connector on the unit, while an alternate embodiment may be utilized in the to test the various electrical systems on the trailers.

U.S. Pat. No. 5,055,986
Inventor: Mary B. Johnson
Issued: Oct. 8, 1991

A combination light, radio and clock which is designed for operation two types of batteries, one of which is supplied by conventional alternating current. The device includes a cabinet or housing designed for mounting on a wall or resting on a flat surface, with an incandescent light, a radio and a clock mounted wherein. The light, clock and radio may be utilized during normal operating periods by conventional alternating current which is converted to direct current by a transformer and during emergencies by a rechargeable battery, as well as one or more replaceable, rechargeable or non-rechargeable batteries.

U.S. Pat. No. 5,321,349
Inventor: I-Chang Chang
Issued: Jun. 14, 1994

A rechargeable/portable multi-voltage DC power supply includes an Ni-Cd rechargeable battery set connected to a switching power converting circuit, a pulse width modulation circuit, and a filter circuit for providing a regulated output voltage from the filter circuit. A button switch cooperates with a selection circuit and a feedback ratio circuit for selecting a specific output voltage from a plurality of available output voltages. A plurality of light emitting diodes are to the selection circuit for indicating the value of the output.

U.S. Pat. No. 6,045,235
Inventor: Robert K. Hee
Issued: Apr. 4, 2000

A DC power supply unit comprising a flashlight. A rechargeable cellular telephone battery is provided, having a positive terminal and a negative terminal. The rechargeable cellular telephone battery is supported in the flashlight. An adjustable structure is in the flashlight for electrically connecting the flashlight to the positive and the negative terminal of the rechargeable cellular telephone battery can operate the flashlight. A facility in the flashlight is for connecting the rechargeable cellular telephone battery to a remote electrical device so that the rechargeable cellular telephone battery can operate the remote electrical device.

SUMMARY OF THE PRESENT INVENTION

The present invention relates generally to rechargeable battery systems and, more specifically it relates to a DC power supply unit including pivotably adjustable external positive and negative contacts for establishing a connection with terminals of an external battery and providing power from the external battery to a flashlight, the battery being releasably secured to the DC power supply unit by a clamping mechanism.

A primary object of the present invention is to provide a DC power supply unit that will overcome the shortcomings of prior art devices.

Another object of the present invention is to provide a DC power supply unit including a flashlight having external, pivotably adjustable positive and negative contacts, whereby the flashlight can be operated by any type of rechargeable battery placed in contact with the positive and negative terminals.

An additional object of the present invention is to provide a DC power supply unit in which the rechargeable battery is secured to the DC power supply by a clamping device.

A further object of the present invention is to provide a DC power supply unit wherein the rechargeable battery is a cellular telephone battery.

A yet further object of the present invention is to provide a DC power supply unit in which the flashlight contains exterior terminals or a jack providing an electrical connection point between the rechargeable cellular telephone battery and other remote electrical devices.

Another object of the present invention is to provide a DC power supply unit that is simple and easy to use.

A still further object of the present invention is to provide a DC power supply unit that is economical in cost to manufacture.

Additional objects of the present invention will appear as the description proceeds.

A power supply unit for connecting a flashlight to an external power supply such as a rechargeable cellular telephone battery is disclosed by the present invention. The power supply unit includes a housing and a pair of terminals positioned on the housing, the pair of terminals including a positive terminal and a negative terminal. A first flashlight is positioned within the housing and connected to the pair of terminals. A switch is connected between the pair of terminals and the first flashlight. A clamp releasably secures the external power supply to the housing such that a positive and negative terminals contact both a positive and negative terminal on the external power supply, respectively. When the switch is toggled, a voltage is supplied from the external power supply to the first flashlight causing the first flashlight to illuminate. A second flashlight is also positioned in the housing and is connected to the terminals via the switch. The positive and negative terminals each include a first section secured to the housing and a second section pivotally connected to the first section and able to pivot 360° about the first section. A pair of auxiliary terminals are connected to the positive and negative terminals for supplying power to a peripheral device. The switch is a three position switch for connecting either the first flashlight, second flashlight auxiliary terminals to the positive and negative terminals.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
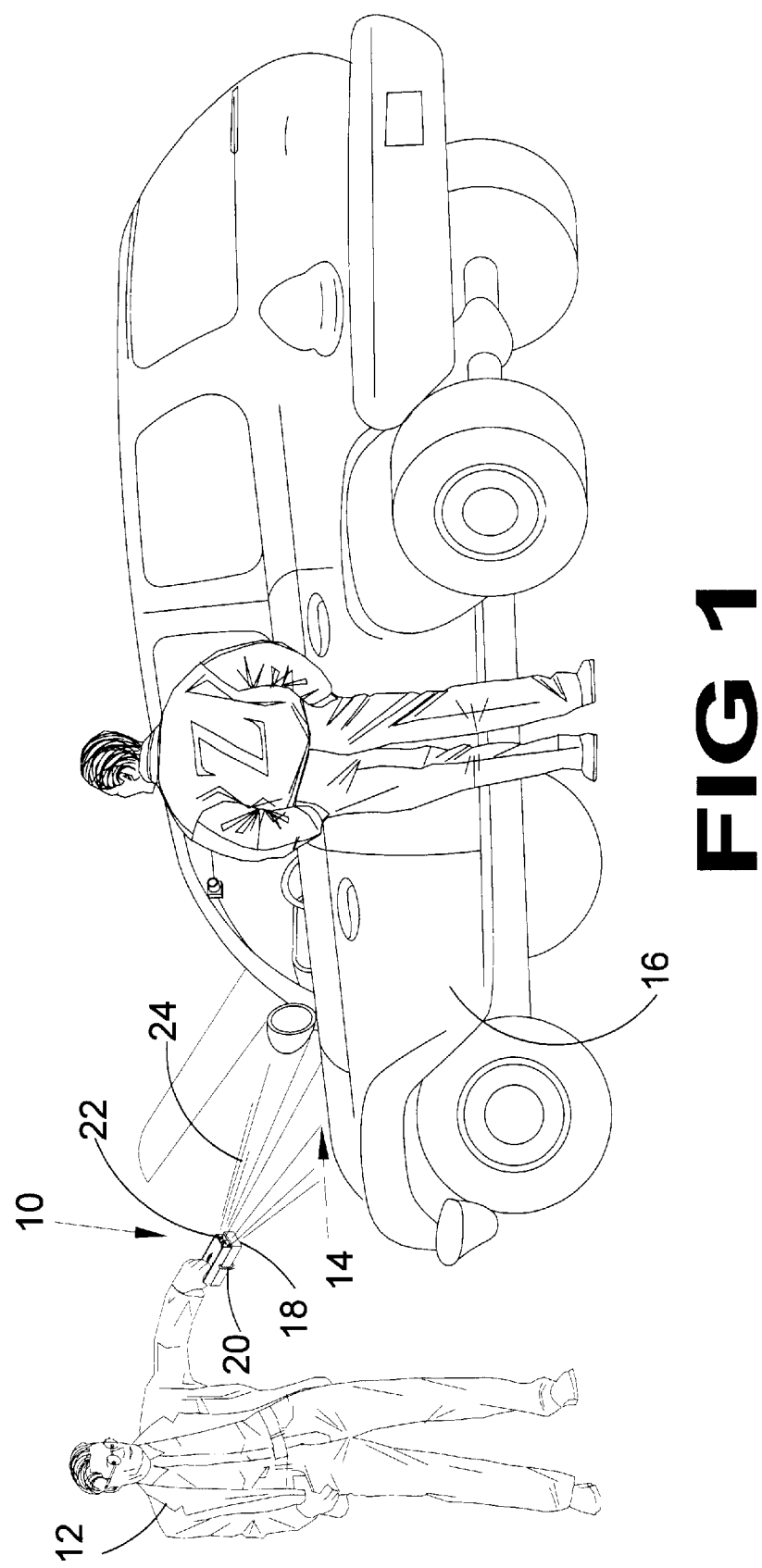
FIG. 1 is a perspective view of a person using the DC power supply of the present invention connected to an external battery for supplying power to a flashlight.

Turning now descriptively to the drawings, in which similar reference characters denote similar elements throughout the several views, the Figures illustrate the DC power supply unit of the present invention. With regard to the reference numerals used, the following numbering is used throughout the various drawing figures.

10 DC power supply unit of the present invention
12 person using DC power supply unit
14 engine being illuminated by DC power supply unit
16 automobile
18 external power source
20 clamp
22 flashlight
23 first end of housing
24 lines indicating light produced by flashlight
26 housing
28 first side of housing
30 switch
32 positive contact terminal
34 negative contact terminal
36 light bulb
38 translucent lens cover
40 second side of housing
42 recess on second side of housing
44 lamp holder
46 screen
48 recess in screen
50 first terminal of lamp holder
52 second terminal of the lamp holder
54 second end of housing
56 second flashlight
58 lightbulb of second flashlight
60 lens cover of second flashlight
62 lamp holder of second flashlight
64 screen of second flashlight
66 recess of second flashlight
68 first terminal of the lamp holder
69 second terminal of lamp holder
70 cover
72 pair of remote terminals
74 first pair of terminals
76 second pair of terminals
78 positive contact terminal
80 negative contact terminal
82 first end of contact terminal
84 second end of contact terminal
86 arrow indicating pivoting of the second end 88 arrow indicating pivoting of the second end of the terminal to one side
90 arrow indicating pivoting of the second end on a second side of the first end
92 first contact on first end of terminal
94 second contact on second end of terminal
96 top side of the battery
98 positive contact terminal
100 negative contact terminal
102 locking pin
104 clamping surface
106 telescoping tube
108 thumb screw
110 recess
112 first section of telescoping tube
114 second section of telescoping tube
116 arrow indicating movement of second section of telescoping tube
118 first terminal of switch
120 second terminal of switch
122 third terminal of switch
124 positive terminal strip
126 negative terminal strip
128 first light bulb receiving portion
130 second light bulb receiving portion

DETAILED DESCRIPTION OF THE PREFERRED EMBODIMENT

Turning now descriptively to the drawings, in which similar reference characters denote similar elements throughout the several views, FIGS. 1 through 11 illustrate the DC power supply unit of the present invention indicated generally by the numeral 10.

The DC power supply unit 10 is shown in FIG. 1 being used by a person 12 for illuminating an object. In the present example, the object is an engine 14 of an automobile 16. The DC power supply unit 10 is held by the person 12 and is connected to an external power source 18. The external power source 18 comprising a battery is releasably secured to the DC power supply unit 10 by a clamp 20. When secured together by the clamp 20, contact terminals on the DC power supply unit 10 engage with contact terminals on the external power source 18 to provide power to a flashlight 22 of the DC power supply unit 10. The light being provided by the flashlight 22 is indicated by the lines labeled with the numeral 24.

Figure 2:
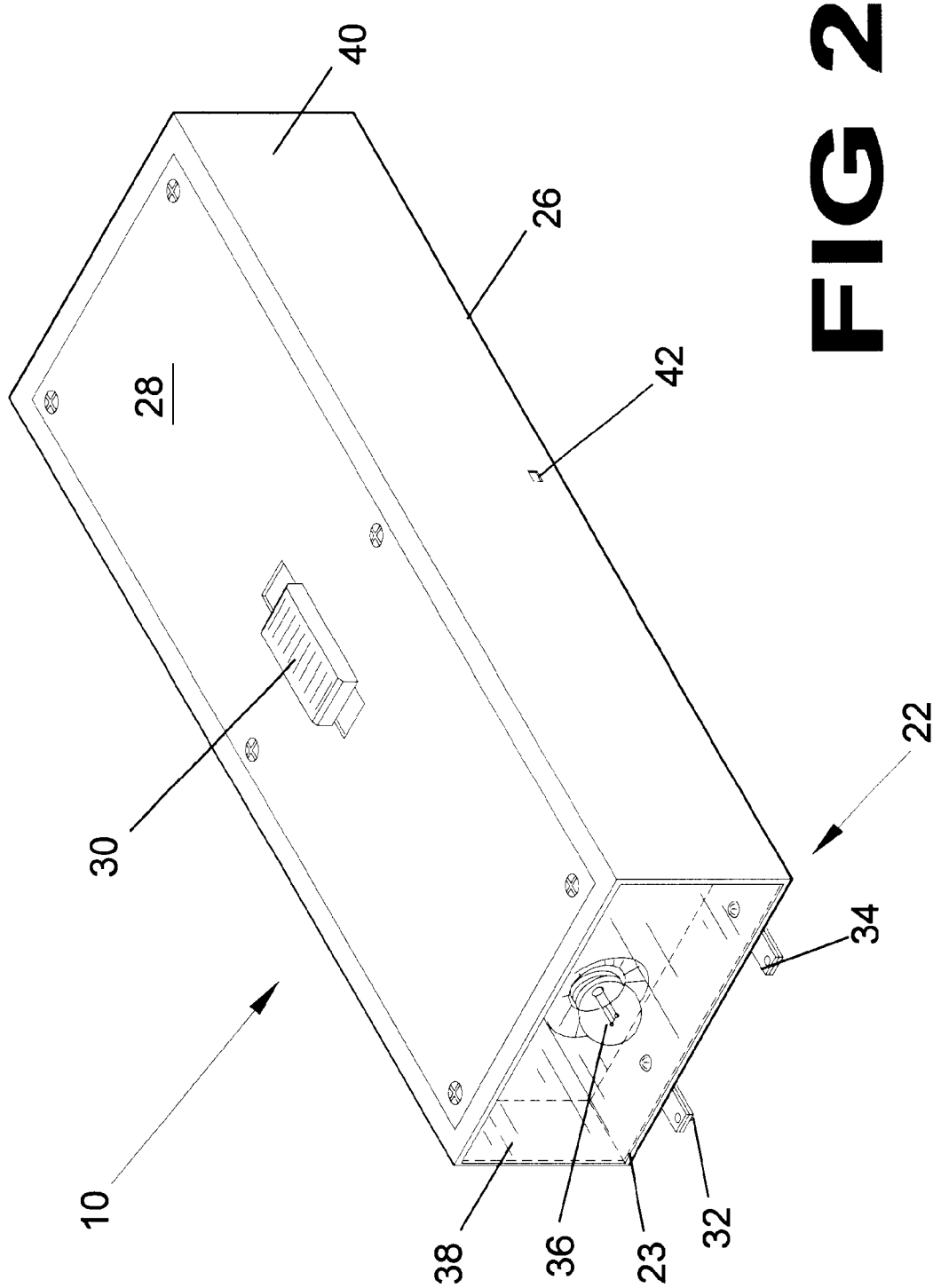
FIG. 2 is a perspective view of the DC power supply unit of the present invention including pivoting contact terminals folded into the closed position.

FIG. 2 illustrates a perspective view of the DC power supply unit 10. As can be seen from this view, the DC power supply unit 10 includes a housing 26 with the flashlight 22 positioned at a first end 23 thereof. The flashlight 22 is able to project light therefrom out the first end 23 of the housing 26. Positioned at an end of the housing 26 are a positive contact terminal 32 and a negative contact terminal 34. Positioned on an opposite end of the housing 26 and not shown in this figure is a second pair of positive and negative contact terminals. The positive and negative contact terminals 32 and 34, respectively, are pivotally connected to the housing 26. The flashlight 22 includes a light bulb 36 and a translucent lens cover 38 covering the light bulb 36. A second flashlight, not shown in this figure, is positioned on a side of the housing opposite the flashlight 22 and connected to be provided power through the second pair of positive and negative contact terminals. On a second side 40 of the housing 26 is a recess 42 for receiving an end of a clamp device. The clamp device will be discussed hereinafter with specific reference to FIGS. 6, 7 and 8. Positioned on a first side 28 of the housing 26 is a switch 30 for controlling the power output of the DC power supply unit 10. The switch 30 shown in the figures is a three position switch. This switch 30 will connect either the positive terminal 32 to provide power to the flashlight 22, the positive contact terminal of the second pair to provide power to the flashlight on the opposite side of the housing or disconnect both positive terminals thereby preventing power from being provided to either of the flashlights.

Figure 3:
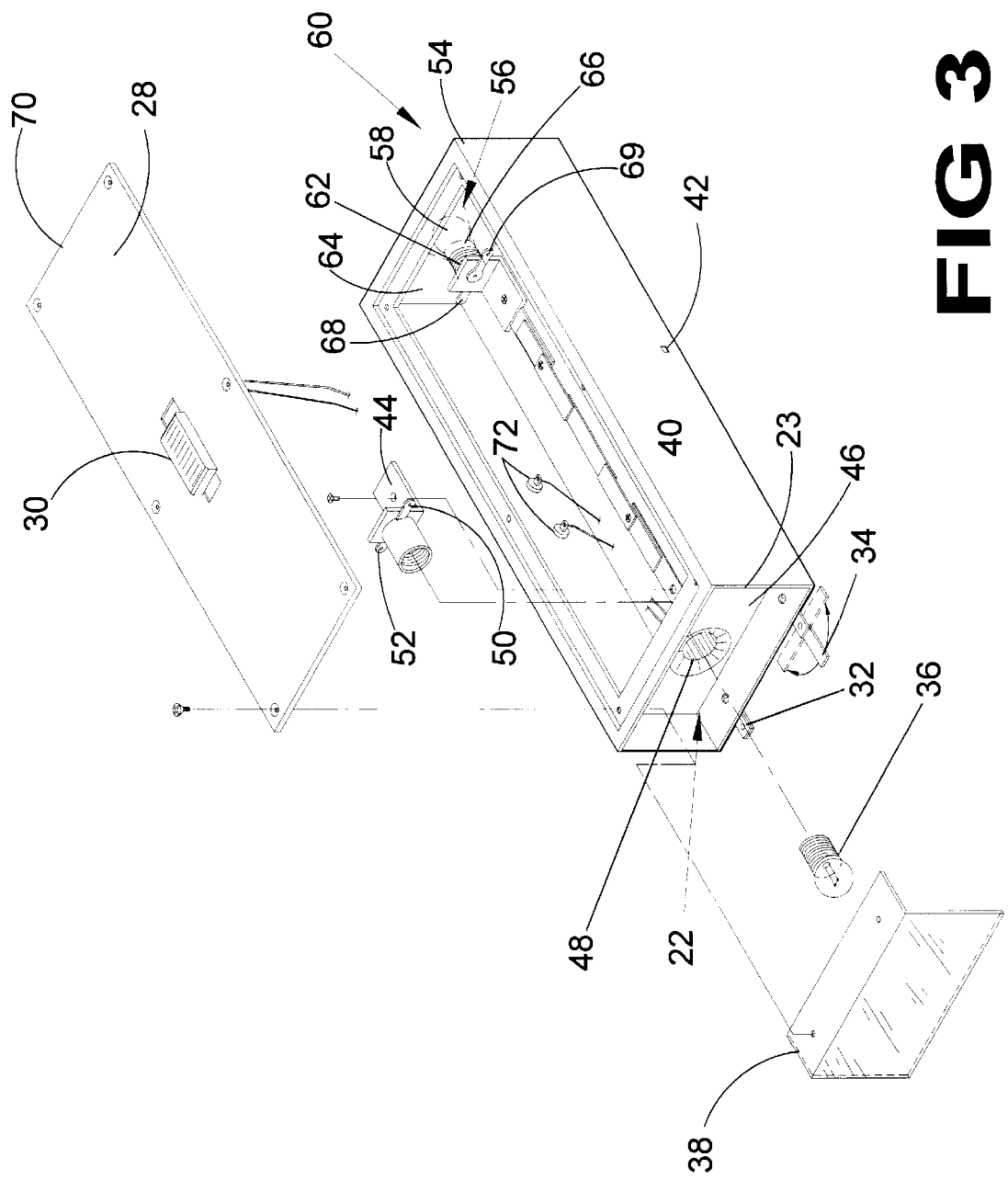
FIG. 3 is an exploded view of the DC power supply unit of the present invention.

An exploded view of the DC power supply unit 10 is shown in FIG. 3. As can be seen from this view, the first flashlight 22 is positioned at the first end 23 of the housing 26. The first flashlight includes the lightbulb 36 and the lens cover 38. A lamp holder 44 is positioned at the first end 23 and within the housing 26. A screen 46 including a recess therein is positioned between the lamp holder 44 and the first end 23. A recess 48 extends through the screen 46 and is aligned with the lamp holder 44. The light bulb 36 extends partially through the recess 48 and is received within the lamp holder 44. A first terminal 50 of the lamp holder 44 is connected to the negative terminal 34 and a second terminal 52 of the lamp holder 44 is connected to a first terminal of the switch 30. The switch selectively connects the second terminal of the lamp holder 44 to the positive terminal 32.

At a second end 54 of the housing 26 is a second flashlight 56. The second flashlight 56 includes a lightbulb 58 and a lens cover 60. A lamp holder 62 is positioned at the second end 54 and within the housing 26. A screen 64 including a recess 66 therein is positioned between the lamp holder 62 and the second end 54. The recess 66 extends through the screen 64 and is aligned with the lamp holder 62. The light bulb 58 extends partially through the recess 66 and is received within the lamp holder 62. A first terminal 68 of the lamp holder 62 is connected to a negative terminal of the second pair of terminals and a second terminal 69 of the lamp holder 62 is connected to a positive terminal of the switch 30. The switch 30 selectively connects the second terminal 69 of the lamp holder 62 to the positive terminal.

The first side 28 of the housing 26 is in the form of a cover 70 which is removable. The cover 70 is removable to provide access to the inside of the housing and thereby facilitate repairs of the DC power supply unit 10. A pair of remote terminals 72 are provided for connecting an additional peripheral device to the DC power supply unit 10. The additional peripheral device can then receive power from the battery 18. The recess 42 for receiving the clamp is provided on the second side 40 of the housing 26.

Figure 4:
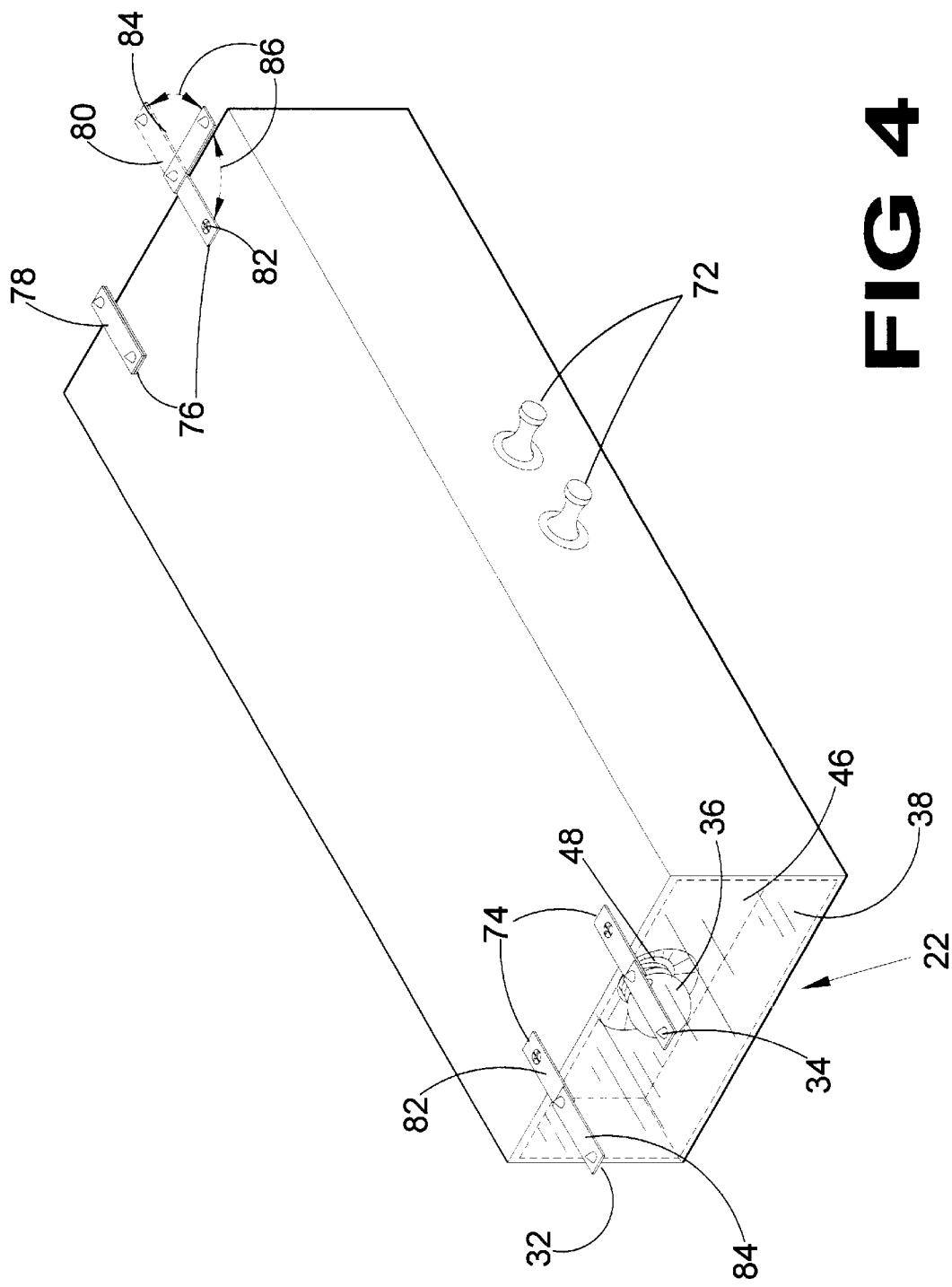
FIG. 4 is a bottom perspective view of the DC power supply unit of the present invention showing the pivoting contact terminals pivoted into various positions.

A bottom side view of the DC power supply unit 10 is shown in FIG. 4. This figure shows the first pair of terminals 74 and the second pair of terminals 76. The first pair of terminals includes the positive contact terminal 32 and the negative contact terminal 34. As can be seen, these terminals are positioned adjacent the flashlight 22 to which they provide power. The second pair of terminals 76 includes a positive contact terminal 78 and the negative contact terminal 80. Each of the terminals includes a first end 82 secured to the housing 26 and a second end 84 pivotally connected to the first end 82. The second end is able to pivot through a range of 360°. The pivotal movement of the second end 84 of the contact terminal through a 180° range is shown by the arrows labeled with the numeral 86. The positive terminal 32 and negative terminal 34 of the first pair of terminals 74 are illustrated in the fully extended position and the positive terminal 78 of the second pair of terminals 76 is shown in the unextended position. The remote terminals are shown in this figure extending from a side of the housing 26. The flashlight 22 on the first end 23 of the housing 26 is also seen from this view.

Figure 5:
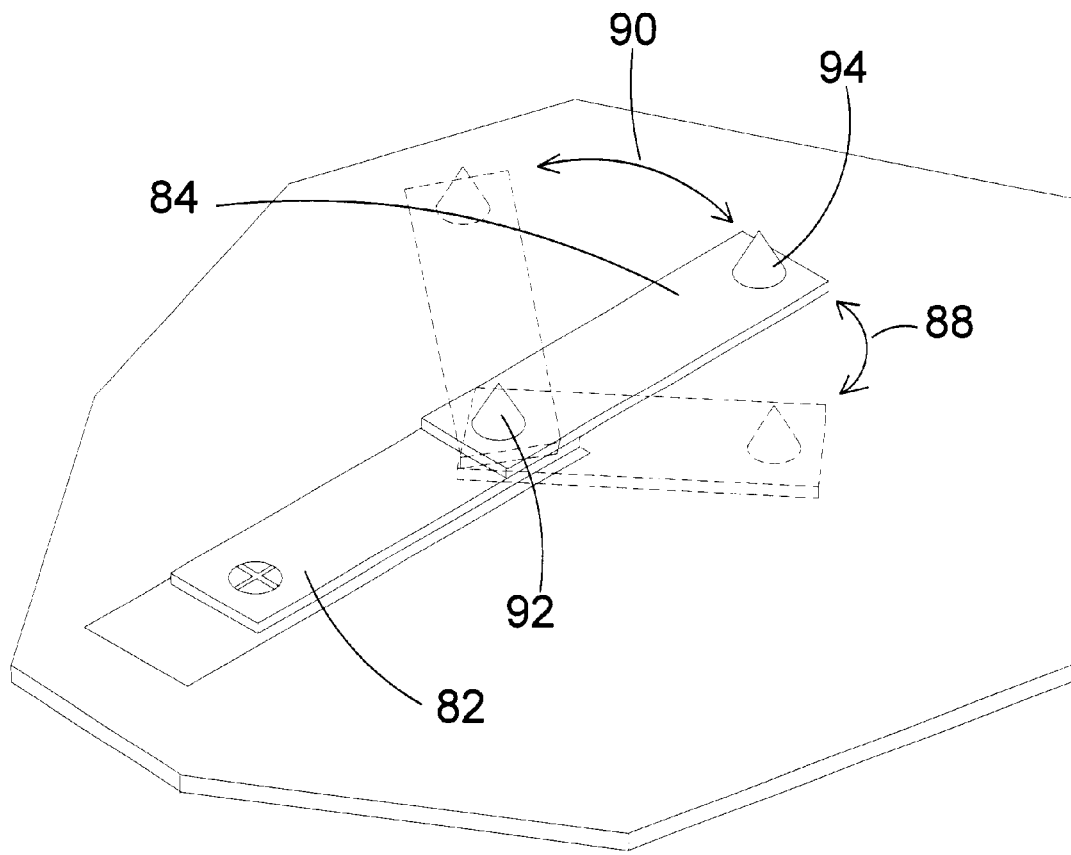
FIG. 5 is an enlarged perspective view of a pivoting contact terminal of the DC power supply unit of the present invention.

An enlarged view of one contact terminal is illustrated in FIG. 5. As can be seen from this view, the contact terminal includes the first end 82 and the second end 84. The first end 82 is secured to an end of the housing 26 and the second end 84 is pivotally connected to an end of the first end 82. The second end 84 includes a first contact 92 on one end thereof and a second contact 94 on a second end thereof for engaging the contacts on the external battery. An arrow 88 illustrates the pivoting of the second end 84 of the terminal on one side of the first end 82 and the arrow 90 illustrates the pivoting of the second end 84 on a second side of the first end 82. The second end is able to pivot about its connection point to the first end 82 about a 360° range.

Figure 6:
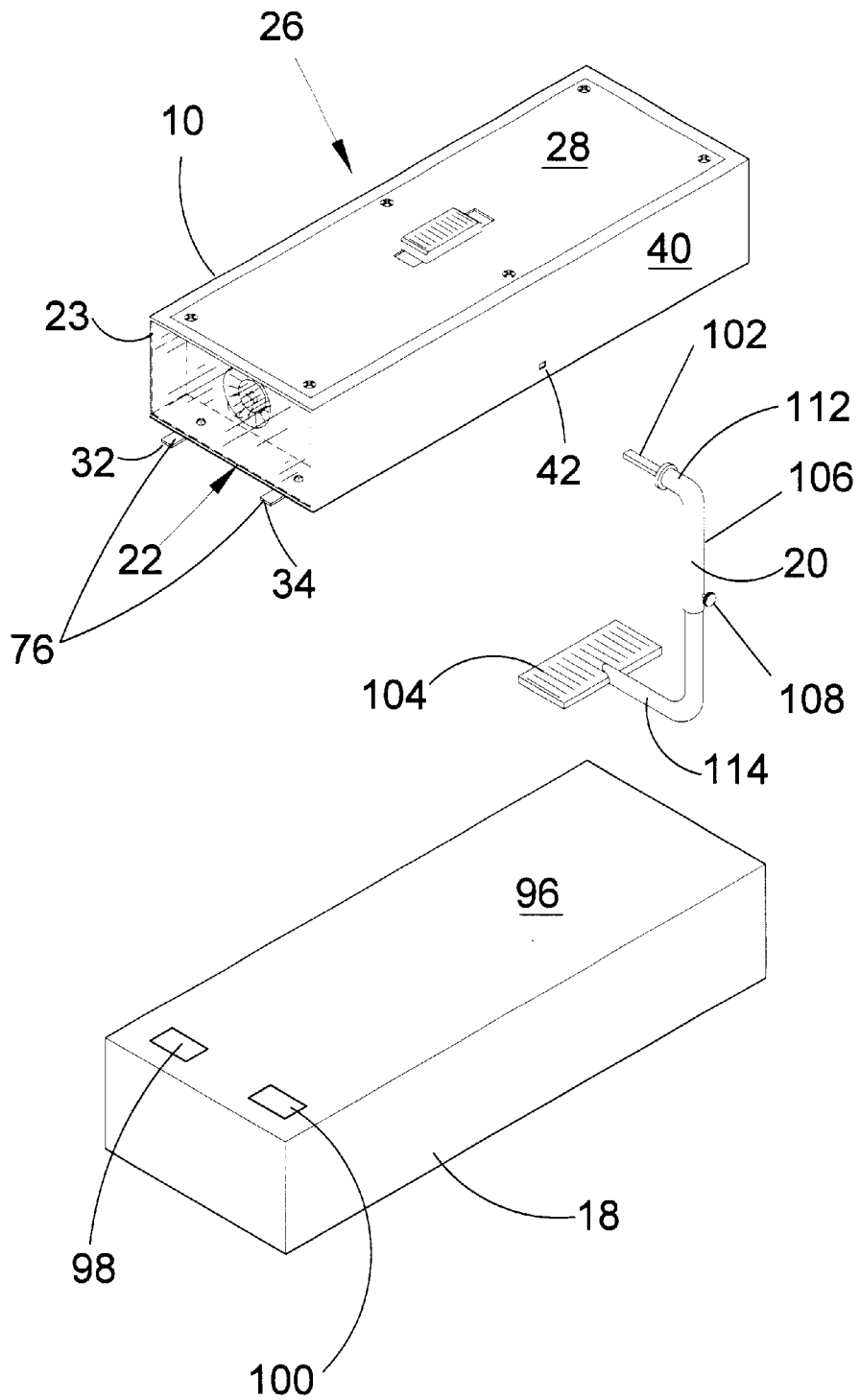
FIG. 6 is an exploded perspective view of the DC power supply unit of the present invention and a rechargeable cellular telephone battery with the clamping tube for securing them together.

An exploded view of the DC power supply unit 10, battery 18 and clamp 20 for releasably securing the DC power supply unit 10 to the battery 18 is shown in FIG. 6. As can be seen from this view, the positive terminal 32 and negative terminal 34 of the first pair of terminals 76 are pivoted to extend from the first end 23 of the housing. Positioned on a top side 96 of the battery are a positive contact terminal 98 and a negative contact terminal 100. When the DC power supply unit 10 is positioned adjacent the battery 18, the positive terminal 32 should be aligned with the positive terminal 98 of the battery 18 and the negative terminal 34 should be aligned with the negative terminal 100 of the battery 18. The clamp 20 includes a locking pin 102 which is inserted into the recess 22 on the second side 40 of the housing 26. A clamping surface 104 is provided on a second end of the clamp 20 and a telescoping tube 106 connects the locking pin 102 and the clamping surface 104. A thumb screw 108 is provided for adjusting the length of the telescoping tube 106. The thumb screw 108 extends through a recess 110 in a first section 112 of the telescoping tube 106 and a second section of 114 of the telescoping tube 106 extends into the first section 112. The thumb screw 108 is provided to engage the second section 114 and retains the second section 114 in position to thereby retain the clamp at a predetermined size. The clamping surface 104 is positioned on a side of the battery 18 opposite the positive and negative terminals 98 and 100. When secured together, the DC power supply unit 10 is positioned against a side of the battery 18 whereby the positive terminal 32 of the DC power supply unit 10 is aligned with the positive terminal 98 of the battery 18 and the negative terminal 34 of the DC power supply unit 10 is aligned with the negative terminal 100 of the battery 18. The thumb screw 108 of the clamp 20 is then turned to release from its engagement with the second section 114 of the clamp 18 and the clamp 18 is extended to a length greater than the combined width of the DC power supply unit 10 and the battery 18. The locking pin is then inserted into the recess 42 and the clamping surface 104 is positioned beneath the battery 18. The clamping surface 104 is then raised to the surface of the base of the battery 18 by inserting the second section 1 14 further into the first section 112. When the clamping surface 104 engages the base of the battery 18, the thumb screw 108 is then turned to engage the second section 114 and retain the position of the second section 114. The clamp 20 will retain the DC power supply unit 10 in contact with the battery 18 until the thumb screw 108 is released from its position.

Figure 7:
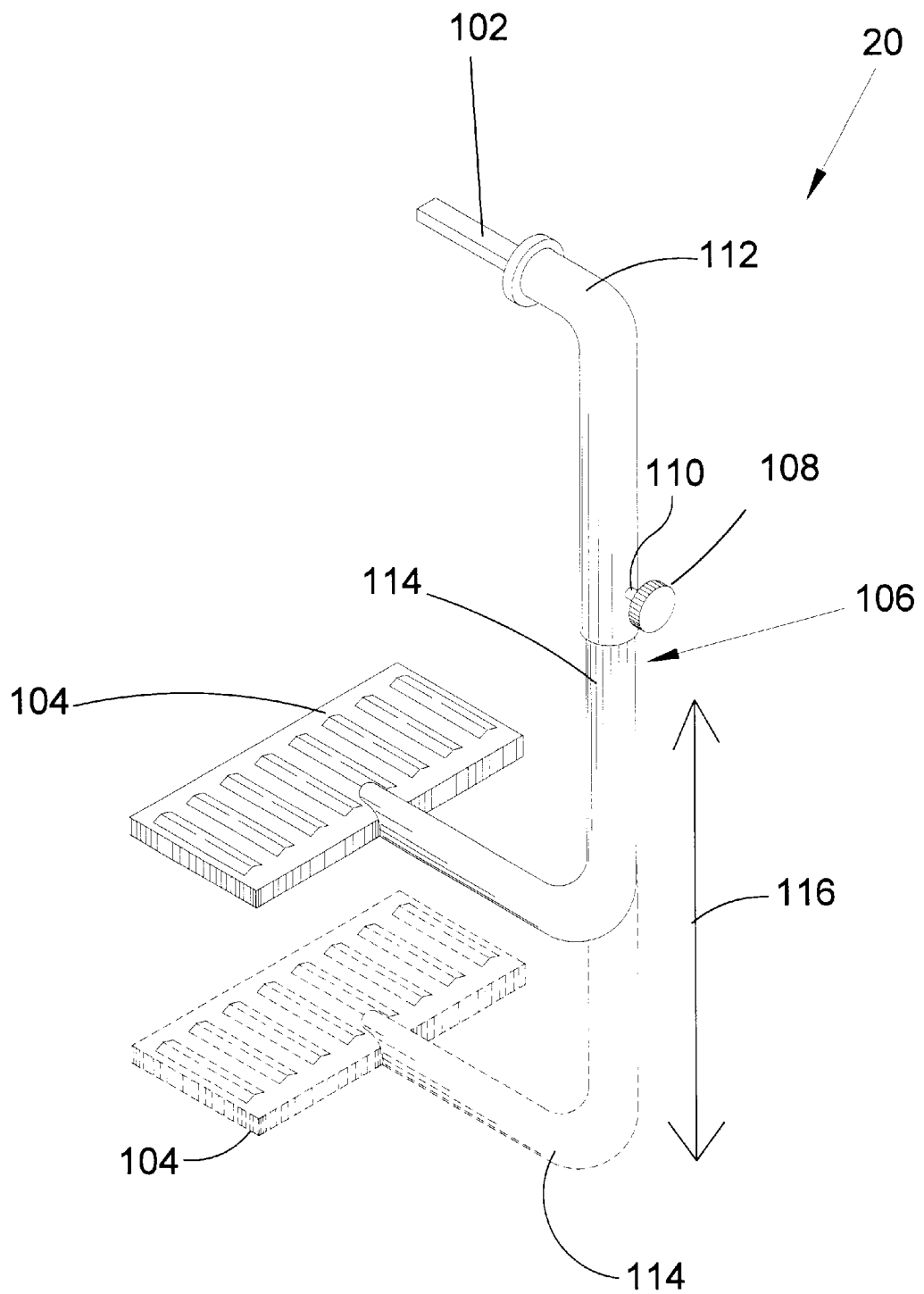
FIG. 7 is a perspective view or the telescoping clamping tube for connecting the DC power supply unit of the power present invention to a power supply.

An enlarged view of the clamp 20 is shown in FIG. 7. As can be seen from this view, the clamp 20 includes the locking pin 102 on one side thereof and the clamping surface 104 on a second end of the clamp 20 opposite the locking pin 102. The telescoping tube 106 extends between and connects the locking pin 102 and the clamping surface 104. The telescopic tube 106 includes the first section 112 and the second section 114. The first section 112 is connected to the locking pin 102 at one end and receives the second section therein at the second end. The second section 114 is connected to the clamping surface 104 at the end opposite that received by the first section 112. The thumb screw 108 extends partially through the recess 110 in the first section 112 and engages the second section 114 extending therein. The thumb screw 108 is provided for adjusting the length of the telescoping tube 106. The thumb screw 108 is provided to engage the second section 114 and retains the second section 114 in position to thereby retain the clamp 20 at a predetermined size. The length of the telescopic tube 106 can be increased or decreased as desired by releasing the engagement of the thumb screw 108 with the second section 114 and moving the second section 114 in the desired direction as indicated by the arrow labeled with the numeral 116. The clamp 20 is shown in a retracted position and is also shown in its fully extended position in dashed lines.

Figure 8:
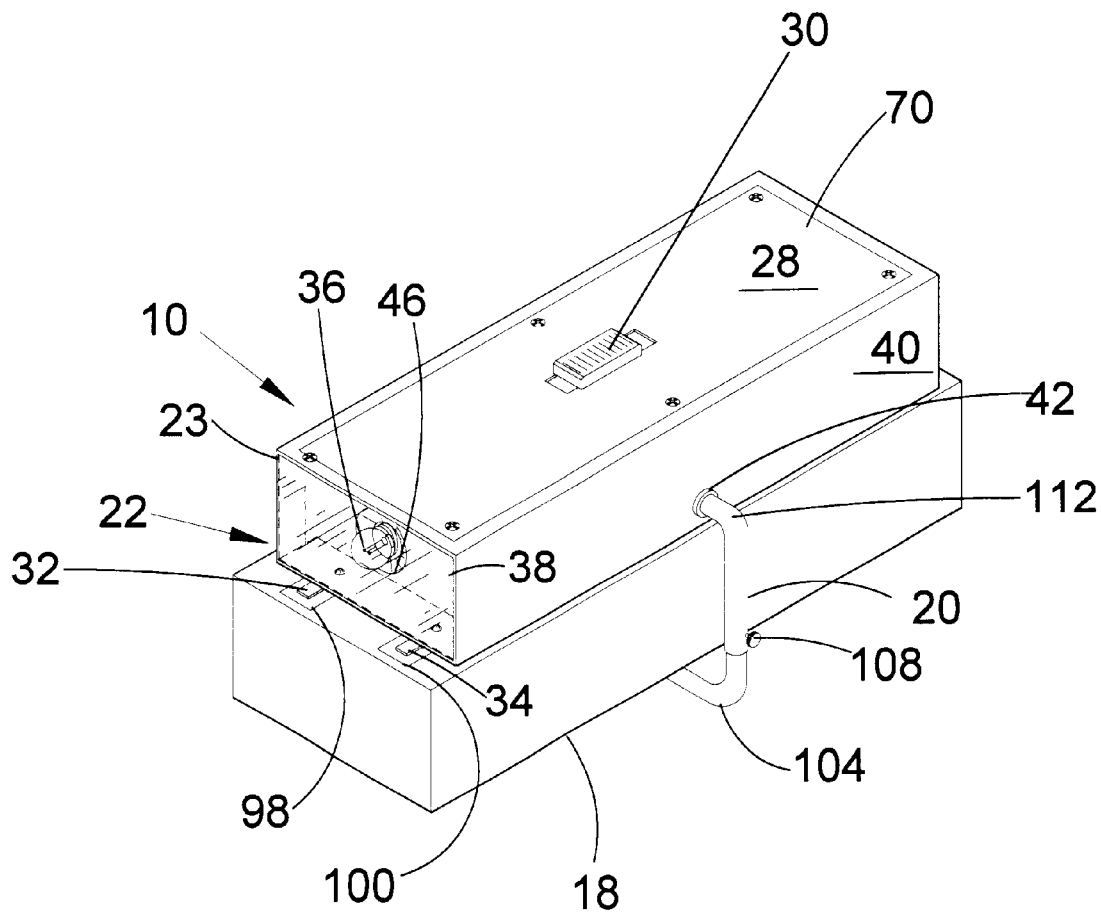
FIG. 8 is a perspective view of the DC power supply unit of the present invention clamped to a rechargeable cellular telephone battery.

An enlarged view of the DC power supply unit 10 in connection with the battery 18 is shown in FIG. 8. This view shows the clamp 20 releasably securing the DC power supply unit 10 to the battery 18. As can be seen from this view, the positive terminal 32 of the DC power supply unit 10 is held in contact with the positive terminal 98 of the battery 18 and the negative terminal 34 of the DC power supply unit 10 is held in contact with the negative terminal 100 of the battery 18.

Figure 9:
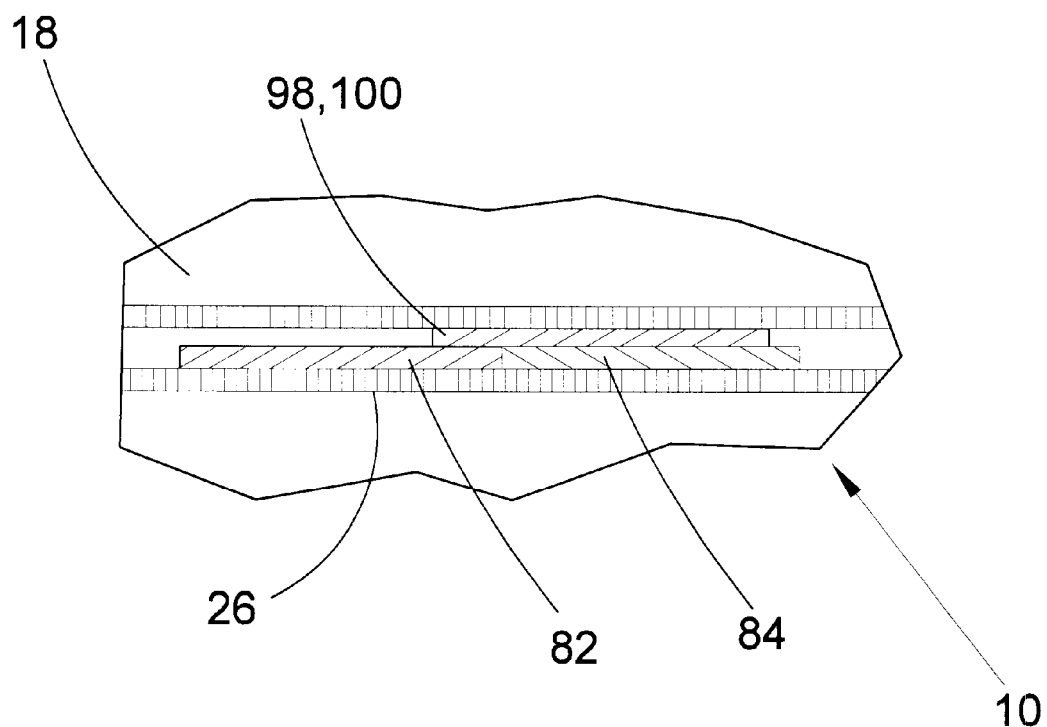
FIG. 9 is cross-sectional side view of the contacts of the rechargeable cellular telephone battery and the contacts on the pivoting terminal of the DC power supply unit of the present invention.

A cross sectional view of the contact between a terminal of the DC power supply unit 10 and a terminal of the battery 18 is shown in FIG. 9. As can be seen from this view, the second section 84 of the contact terminal is pivoted to extend parallel to the first section 82. The terminal 98, 100 of the battery 18 is positioned to contact the second section 84 and at least part of the first section 82 of the terminal of the DC power supply unit 10. When a contact is formed therebetween, conduction of current will occur from the battery 18 to the DC power supply unit 10 through this connection.

Figure 10:
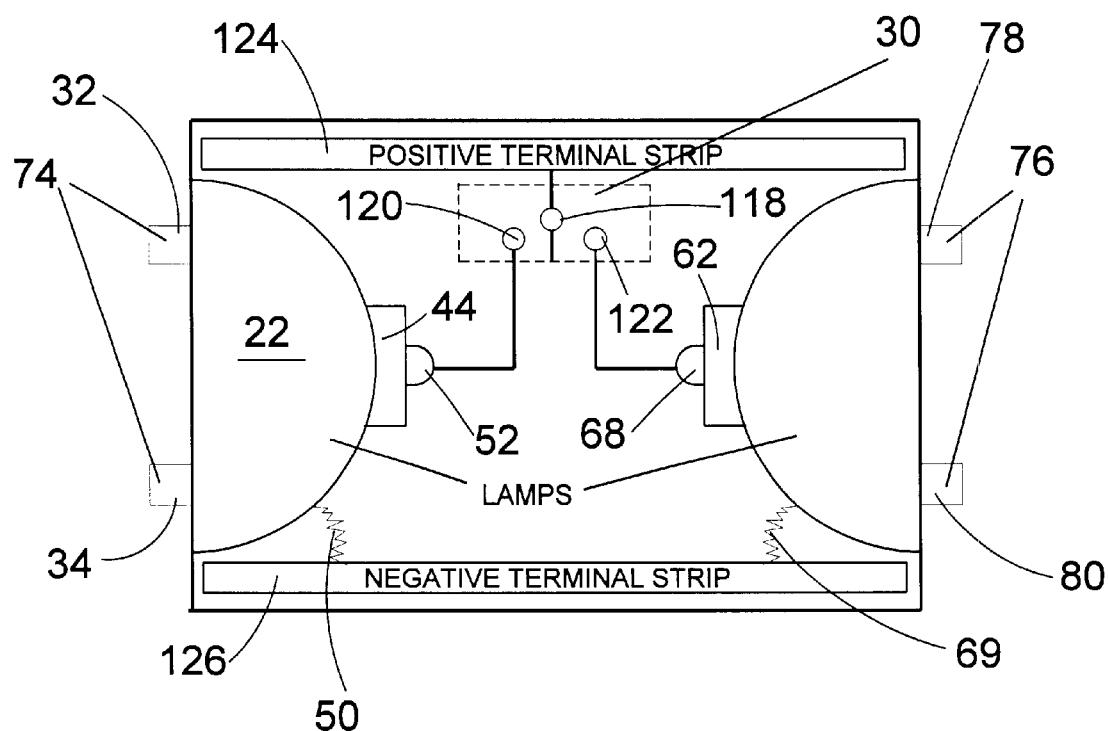
FIG. 10 is a schematic diagram of the DC power supply unit of the present invention.

A schematic view of the DC power supply unit 10 is shown in FIG. 10. This figure illustrates the connection between the positive and negative terminals and the flashlights. As can be seen from this figure, the switch 30 contains a first terminal 118, a second terminal 120 and a third terminal 122. The first terminal 118 is connected to a positive terminal strip 124 and actuates the positive contacts of both the first and second pairs of terminals. The second terminal 120 is connected to the positive lead of the first flashlight 22. The third terminal 122 is connected to the positive lead of the second flashlight. A negative terminal strip 126 is connected between the negative contacts of the first and second pairs of terminals and the negative leads of the first and second flashlights. The at rest position of the switch 30 disconnects the positive terminal strip 124 from both the second and third terminals 120 and 122. When the switch 30 is toggled one way, the second terminal 120 is connected to the positive terminal strip 124 through the first terminal and thereby provides power to the positive lead of the flashlight 22 causing the flashlight 22 to illuminate. When the switch 30 is toggled the other way, the third terminal 122 is connected to the positive power strip 124 through the first terminal and thereby provides power to the positive lead of the second flashlight causing the second flashlight to illuminate.

Figure 11:
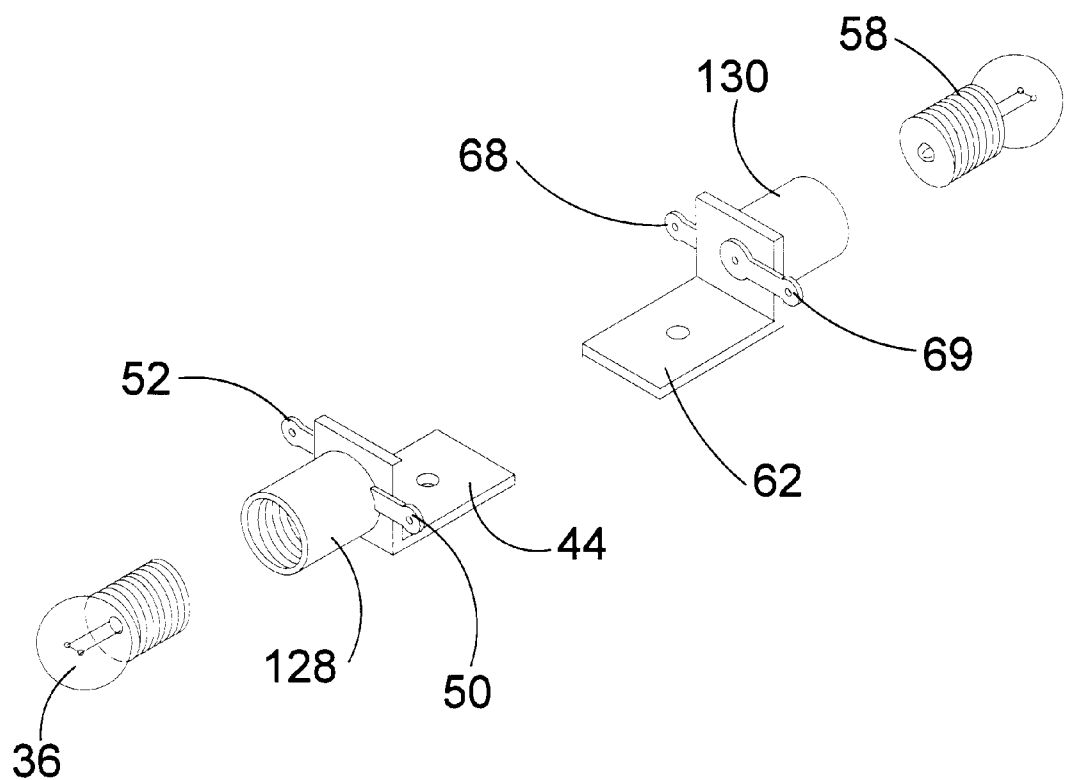
FIG. 11 is a perspective view of the lampholders and light bulbs of the DC power supply unit of the present invention.

The first and second lamp holders 44 and 62 are illustrated in FIG. 11. As can be seen from this figure, the first lamp holder 44 includes a light bulb receiving portion 128, a negative terminal 50 and a positive terminal 52. The light bulb 36 is received within the light bulb receiving portion 128 and upon application of a voltage to the positive terminal 52, the light bulb 36 is caused to illuminate. The negative terminal 50 is constantly connected to a ground potential. The second lamp holder 62 includes a light bulb receiving portion 130, a negative terminal 68 and a positive terminal 69. The light bulb 58 is received within the light bulb receiving portion 130 and upon application of a voltage to the positive terminal 69, the light bulb 58 is caused to illuminate. The negative terminal 68 is constantly connected to a ground potential.

The operation of the DC power supply unit 10 will now be described with reference to the figures. In operation, the DC power supply unit 10 is provided with a flashlight and at least one pair of terminals, a positive terminal and a negative terminal. The positive and negative terminals each include a first section secured to the housing of the DC power supply unit 10 and a second section pivotally connected to the first section. The second section is able to pivot substantially 360° about its connection with the first section and preferably when pivoted to form a 180° angle between the first and second sections, the second section extends over a side of the housing. When it is desired to use the flashlight, the second section is pivoted to form a 180° angle with the first section. The DC power supply unit 10 is now ready to connect with a power source.

A battery 18 including a positive terminal and a negative terminal is positioned in contact with the DC power supply unit 10 such that the positive terminal of the battery contacts the first and second sections of the positive terminal of the DC power supply unit 10 and the negative terminal of the battery contacts the first and second sections of the negative terminal of the DC power supply unit. The thumb screw of the clamp is then rotated to release the second section of the telescoping tube and the second section is at least partially removed from within the first section. The locking pin of the clamp is then inserted in the recess in the side of the terminal of the battery that contacts the first and second sections of the positive terminal of the housing of the DC power supply unit 10. The clamping surface is positioned flat against the side of the battery opposite the side contacting the DC power supply unit 10. The second section is then inserted into the first section such that the clamping section is flush against a side of the battery. The locking screw is then secured within the recess of the first section to engage the second section and retain the second section in it s position. The battery is now clamped to the DC power supply unit 10, the positive terminal of the battery is held in contact with the positive terminal of the DC power supply unit 10 and the negative terminal of the battery is held in contact with the negative terminal of the DC power supply unit 10. At this time, the switch of the DC power supply unit 10 is toggled to provide power to one of the first and second flashlights thereby causing the desired flashlight to illuminate. If the switch is toggled in one direction, the positive terminal of the battery will supply power to the positive lead of the first flashlight through the positive terminal of the DC power supply unit 10, the positive terminal strip, the first and second terminals of the switch and the positive lead of the first flashlight. If the switch is toggled in the opposite direction, the positive terminal of the battery will supply power to the positive lead of the second flashlight through the positive terminal of the DC power supply unit 10, the positive terminal strip, the first and third terminals of the switch and the positive lead of the second flashlight. If the switch remains in the neutral position, power will not be supplied to either flashlight and both flashlights will remain unilluminated.

When the user is finished using the flashlight, the battery must be disconnected from the DC power supply unit 10. In order to do this, the thumb switch will be released and the second section will be removed at least partially from within the first section of the telescoping tube. The battery may now be taken away from its contact with the DC power supply unit 10. When it is desired to use the flashlight a subsequent time, the above steps are followed again.

From the above description it can be seen that the DC power supply unit of the present invention is able to overcome the shortcomings of prior art devices by providing a DC power supply unit which includes a flashlight having external, pivotably adjustable positive and negative contacts, whereby the flashlight can be operated by any type of rechargeable battery placed in contact with the positive and negative terminals. The DC power supply unit includes a clamping device for releasably securing the rechargeable battery to the DC power supply, which is preferably a cellular telephone battery. The DC power supply unit may also contain exterior terminals or a jack for providing an electrical connection point between the rechargeable cellular telephone battery and other remote electrical devices. Furthermore, the DC power supply unit of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, form the standpoint of prior art, fairly constitute essential characteristics of the generic or specific aspects of this invention.

What is claimed is new and desired to be protected by Letters Patent is set forth in the appended claims:

1. A flashlight assembly with external power supply support comprising:
   a) a housing;
   b) a pair of terminals positioned on one side of said housing, said pair of terminals including a positive terminal and a negative terminal;
   c) a first flashlight positioned within said housing and connected to said positive and negative terminals;
   d) a switch connected between said pair of terminals and said first flashlight;
   e) clamp for releasably securing an external power supply to said housing such that a positive terminal on the external power supply contacts said positive terminal and a negative terminal on the external power supply contacts said negative terminal, wherein when said switch is toggled, a voltage is supplied from the external power supply through the positive terminal, said positive terminal of said flashlight assembly, said switch and to said first flashlight causing said first flashlight to illuminate;

f) said external power supply comprises a battery and said housing includes a locking recess and said clamp includes a locking pin, said locking pin being received within said locking recess when releasably securing said unit to the battery;

g) said clamp further includes a clamping surface positioned in a side opposite said locking pin for contacting a side of the battery and maintaining the battery in a releasably secured position against said unit; and h) said clamp further comprises a telescoping tube connected between said locking pin and said clamping surface for changing the distance between said locking pin and clamping surface to accommodate securing of different size batteries to said flashlight assembly.

2. The flashlight assembly as recited in claim 1, wherein said telescoping tube includes a first section connected to said locking pin, a second section connected to said clamping surface and being at least partially received within said first section and a thumb screw extending through said first section for engaging said second section and securing the second section in position within said first section.

3. The flashlight assembly as recited in claim 1, further comprising a second flashlight positioned on a side of said housing opposite said first flashlight and connected to said positive and negative terminals via said switch.

4. The flashlight assembly as recited in claim 3, wherein said switch is a three position switch for connecting either the first flashlight, second flashlight or neither the first and second flashlight to said positive and negative terminals.

5. The flashlight assembly as recited in claim 1, wherein said positive and negative terminals each include a first section secured to said housing and a second section pivotally connected to said first section.

6. The flashlight assembly as recited in claim 5, wherein said second section is able to pivot 3600 about said first section.

7. A flashlight assembly with external power supply support comprising:

a) a housing;

b) a pair of terminals positioned on one side of said housing, said pair of terminals including a positive terminal and a negative terminal;

c) a first flashlight positioned within said housing and connected to said positive and negative terminals;

d) a switch connected between said pair of terminals and said first flashlight;

e) clamp for releasably securing an external power supply to said housing such that a positive terminal on the external power supply contacts said positive terminal and a negative terminal on the external power supply contacts said negative terminal, wherein when said switch is toggled, a voltage is supplied from the external power supply through the positive terminal, said positive terminal of said flashlight assembly, said switch and to said first flashlight causing said first flashlight to illuminate; and f) a pair of auxiliary terminals connected to said positive and negative terminals for connection of a peripheral device to said flashlight assembly and supplying power to said peripheral device from the battery.

8. The flashlight assembly as recited in claim 7, further comprising a pair of auxiliary terminals connected to said positive and negative terminals for connection of a peripheral device to said flashlight assembly and supplying power to said peripheral device from the battery.

9. The flashlight assembly as recited in claim 8, wherein said switch is a three position switch for connecting either the first flashlight, second flashlight or auxiliary terminals to said positive and negative terminals.

\* \* \* \* \*